United States Patent [19]
Misson

[11] Patent Number: 4,488,359
[45] Date of Patent: Dec. 18, 1984

[54] AUTOMATIC GEAR CHECKING STRUCTURE AND METHOD

[75] Inventor: Donald A. Misson, Richmond, Mich.

[73] Assignee: Lear Siegler, Inc., Del.

[21] Appl. No.: 457,498

[22] Filed: Jan. 12, 1983

[51] Int. Cl.³ .............................................. G01B 7/28
[52] U.S. Cl. .......................... 33/179.5 C; 33/179.5 B; 33/179.5 D
[58] Field of Search .................. 33/179.5 C, 179.5 R, 33/179.5 B, 179.5 D, 179.5 E, 199, 147 M

[56] References Cited

U.S. PATENT DOCUMENTS

| | | | |
|---|---|---|---|
| 2,815,579 | 12/1957 | Bassoff | 33/179.5 B |
| 3,096,590 | 7/1963 | Stepanek | 33/179.5 C |
| 3,337,964 | 8/1967 | Anthony | 33/179.5 B |
| 3,851,398 | 12/1974 | Hilburger | 33/179.5 B |
| 4,272,891 | 6/1981 | Fusari | 33/179.5 C |

Primary Examiner—Willis Little
Attorney, Agent, or Firm—Barnes, Kisselle, Raisch, Choate, Whittemore & Hulbert

[57] ABSTRACT

Structure for and a method of automatically gaging gears including structure for and the method of rotating a master gear and a work gear in tight mesh for a single revolution of the work gear sensing parameters of the gears in tight mesh including the angular position of a master gear and work gear in rotation about their axis of generation, center to center distance between the master gear and work gear and the angular deviation of the axis of rotation of the master gear in mesh with the work gear from its position with the gears unmeshed, developing electrical signals representative of the parameters sensed, and checking the shape of the work gear as a function of the electric signals developed.

23 Claims, 11 Drawing Figures

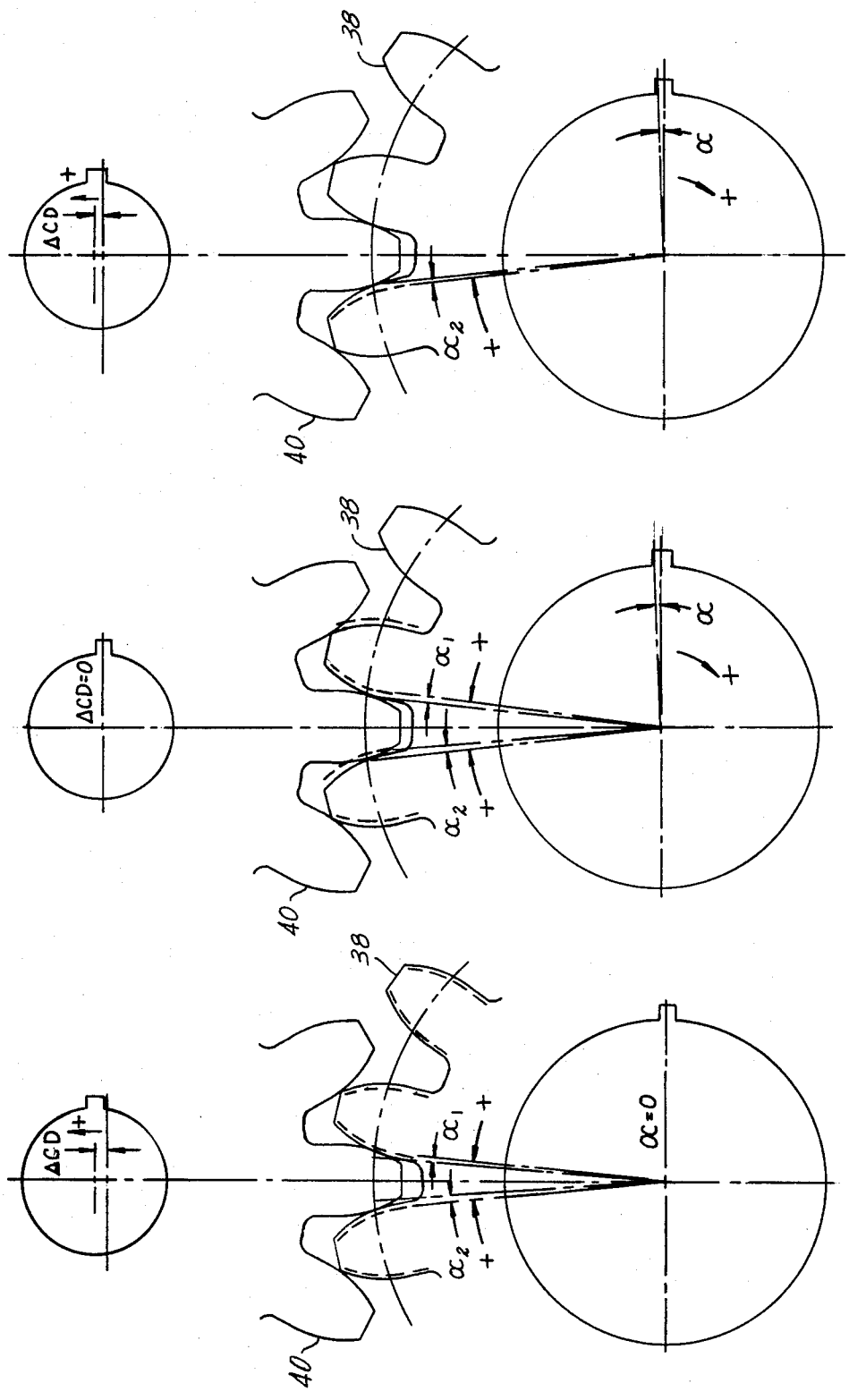

FIG. 11
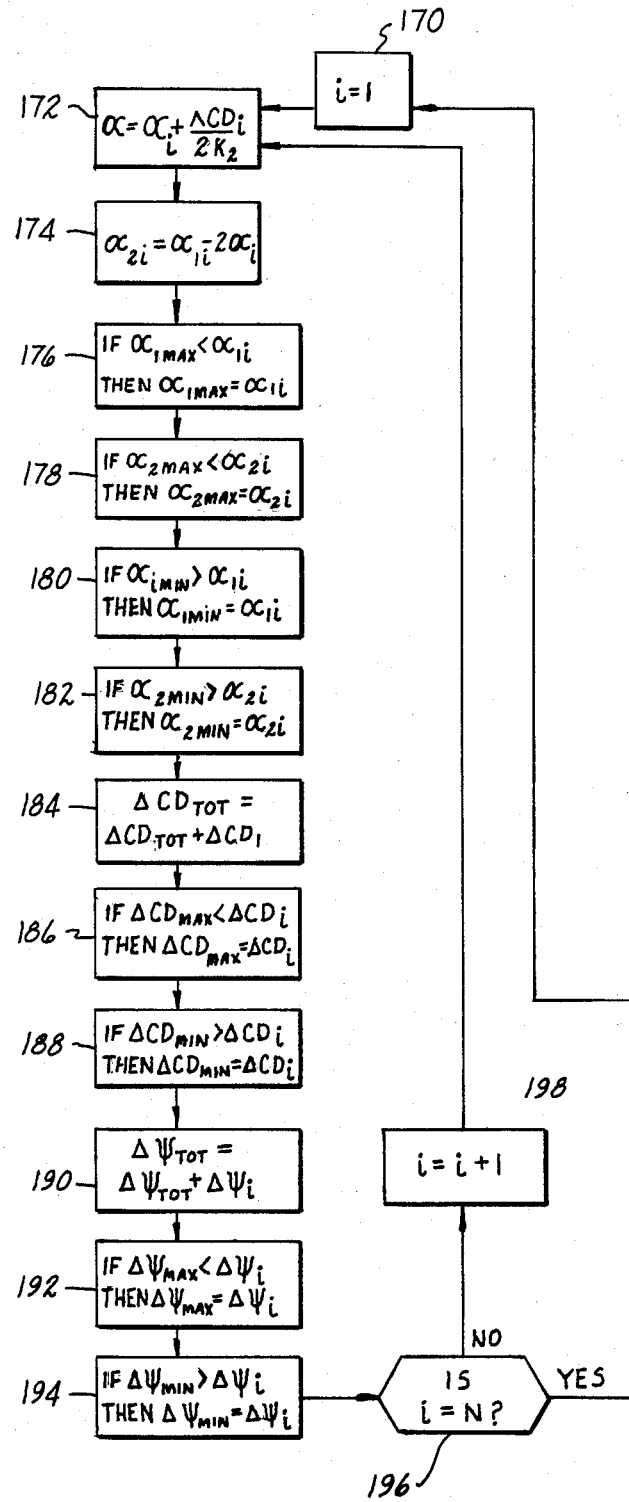
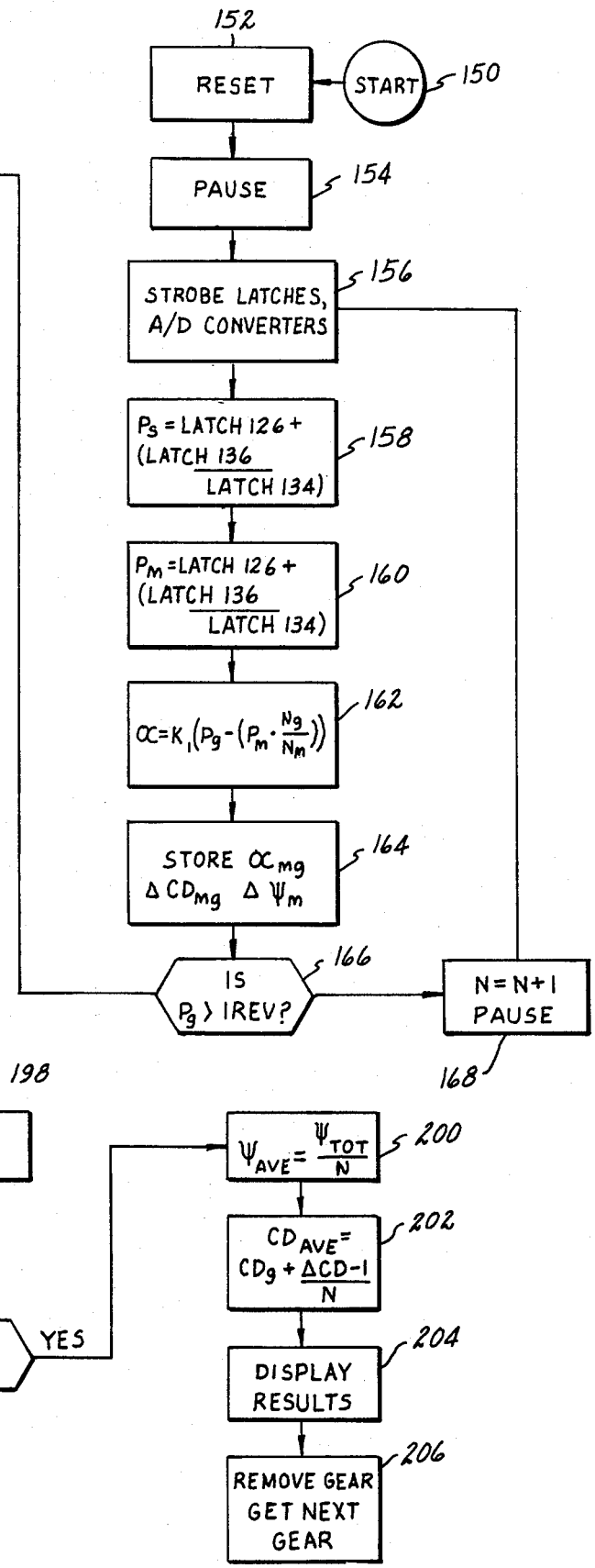

AUTOMATIC GEAR CHECKING STRUCTURE AND METHOD

BACKGROUND OF THE INVENTION

1. Field of the Invention

The invention relates to automatic gear checking structures and methods and refers more specifically to structure for and the method of placing a master gear and a work gear in tight mesh, rotating the meshed gears through at least one revolution of the work gear, sensing a plurality of parameters of the work gear and master gear as they are rotated in tight mesh and determining deviation of the shape of the work gear from a desired shape thereof in accordance with the sensed parameters.

2. Description of the Prior Art

In the past, automatic gear checking structures and methods have sometimes utilized sensing apparatus moved over the surface of a work gear to determine the exact size and/or shape of the gear being checked and have compared the sensed size and/or shape to a desired size and/or shape. Examples of such gear checking structures and methods are found in U.S. Pat. Nos. 3,849,892, 4,276,699, and 4,285,133. Such checks are inherently slow and do not provide the requisite parameters of the work gear in an operating environment. That is, such checks do not provide parameters relating to running the work gear in mesh with another gear.

Also, automatic gear checking structure and apparatus has been provided including structure for loosely meshing a work gear with a master gear so that one flank only of a tooth of the work gear is engaged with a single flank of a tooth of a master gear and the operating parameters of the working gear with respect to the master gear are determined on running the working gear in such loose mesh with the master gear. An example of such a gear checking structure is the Goulden Mikron Type CSF/2, single flank gear tester produced by Goulden Mikron Ltd., Kirkheaton, Huddersfield HD5, OQR, England. Such checking of gears requires the separate checking of both flanks of the teeth of the working gear in separate operations.

Other gear checking structures, such as that disclosed in U.S. Pat. No. 3,405,557, have required the rotation of a master gear at a fixed speed and utilized the angular acceleration of a work gear meshed with the master gear to detect gear tooth profile errors dynamically with the inherent difficulties in maintaining a fixed angular velocity for the master gear and the measurement of minute angular acceleration.

Wherein, a work gear has in the past been run in tight mesh with a master gear and parameters of the rotating meshed gears have been sensed to provide signals which in turn have been utilized to determine the deviation of the shape of the work gear from a desired shape thereof as in U.S. Pat. Nos. 3,851,398, 4,272,891, and 4,321,753, the apparatus provided and/or the method of checking the work gear has required rotation of the work gear in tight mesh with the master gear through more than one revolution and/or have not sensed the angular rotated position of the tight meshed master and work gear to provide a simple, efficient and economical structure for and method of checking the shape of the work gear.

SUMMARY OF THE INVENTION

In accordance with the present invention, automatic gear checking structure is provided for effecting a method of determining the presence of undesirable features in a work gear such as nicks, bumps, angular mispositioning of teeth or of a tooth flank, variation in tooth thickness and helix angle error of a gear tooth in a single revolution of a work gear in tight mesh with a master gear.

The structure of the invention includes means for rotatably mounting a master gear, means for permitting moving the rotatably mounted master gear radially of the master gear and for permitting moving of the master gear so that the axis of generation of the master gear is angularly displaced, means for feeding a work gear into engagement with the master gear, means for rotatably securing the work gear in tight mesh with the master gear, for rotating the work gear in tight mesh with the master gear and for guiding the work gear away from the master gear.

The structure of the invention further includes sensing means operably associated with the mounting means for the master gear and working gear for sensing the angularly rotated position of the master gear and working gear, the angular position of the axis of generation of the master gear, and the center to center distance between the gears and for providing a separate electrical signal representative of each of these parameters. The structure of the invention still further includes electronic means for determining the deviation of the shape of the work gear from a desired shape thereof in accordance with the sensed parameters and for sorting the checked worked gears in accordance with determined deviations of the shape thereof from the desired shape.

In accordance with the method of the invention, the work gears to be checked are rotated in tight mesh with a master gear for one complete revolution of the work gear. The parameters of master gear and work gear angular position, angular position of the axis of generation of the master gear and center to center distance between the master gear and working gear are sensed during the one revolution and the deviation of the shape of the working gear from a desired shape thereof is determined.

BRIEF DESCRIPTION OF THE DRAWINGS

FIG. 6 is an elevation view of a working gear having oversized teeth with equal errors on both flanks in tight mesh with a master gear which is useful in describing the invention.

FIG. 7 is an elevation view of a working gear having misplaced teeth with equal but opposite errors on both flanks in tight mesh with a master gear which is useful in describing the invention.

FIG. 8 is an elevation view of a working gear having an error in a single flank of a tooth in tight mesh with a master gear which is useful in describing the invention.

FIG. 11 is a flow chart useful in programming the operation of the automatic gear checking structure illustrated in FIG. 1 in accordance with the method of the invention.

DESCRIPTION OF THE PREFERRED EMBODIMENT

Figure 1:
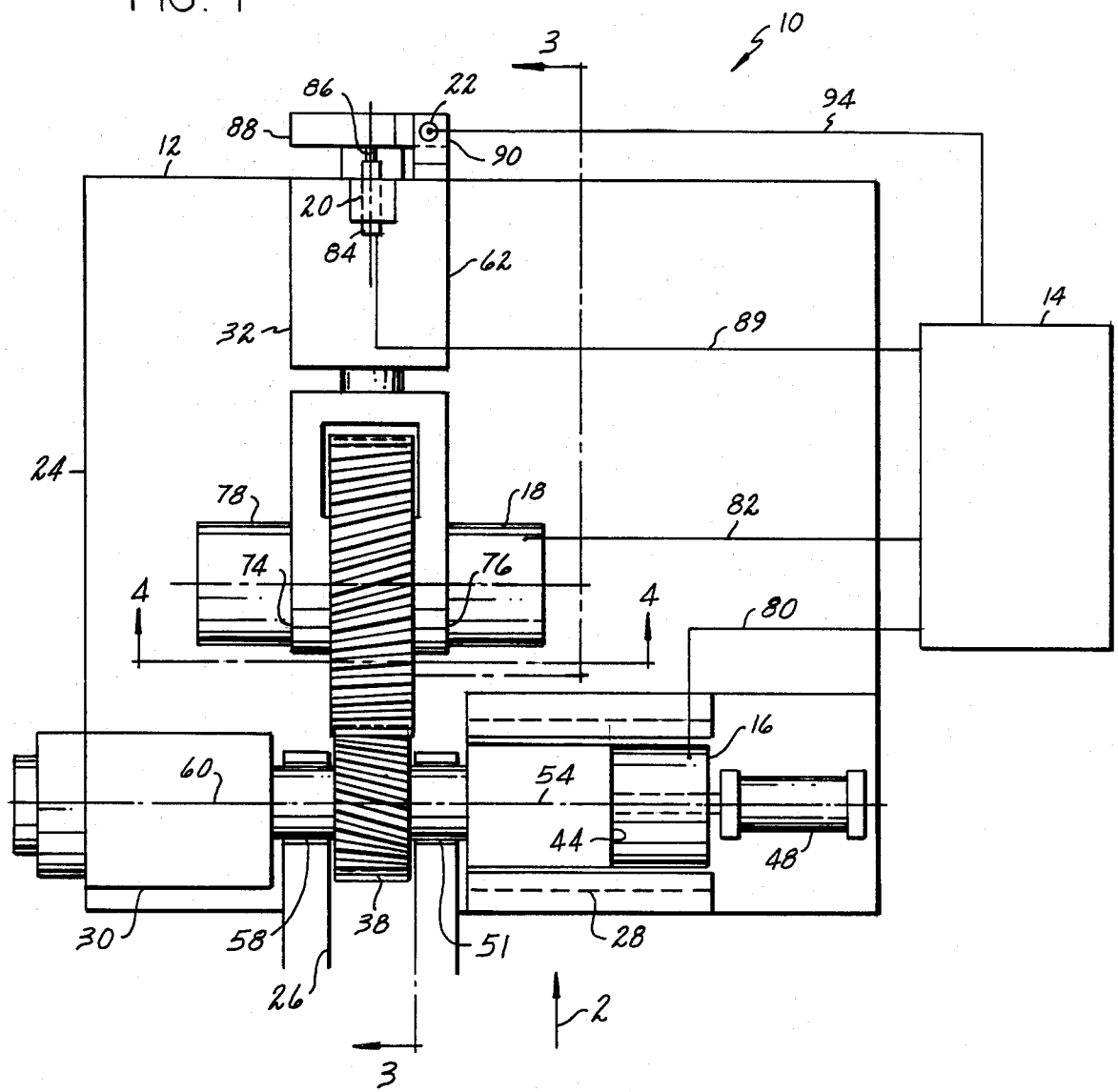
FIG. 1 is a plan view of automatic gear checking structure constructed in accordance with the invention for practicing the method of the invention.

As shown best in FIG. 1, the automatic gear checker 10 of the invention includes a mechanical portion 12, an electronic portion 14, and electromechanical transducers 16, 18, 20, and 22 operable between the mechanical portion 12 and electronic portion 14 of the automatic gear checker 10.

More specifically, the mechanical portion 12 of the automatic gear checker 10 includes a base 24, work gear guide structure 26, work gear mounting structure 28, drive structure 30, and master gear mounting structure 32.

Figure 3:
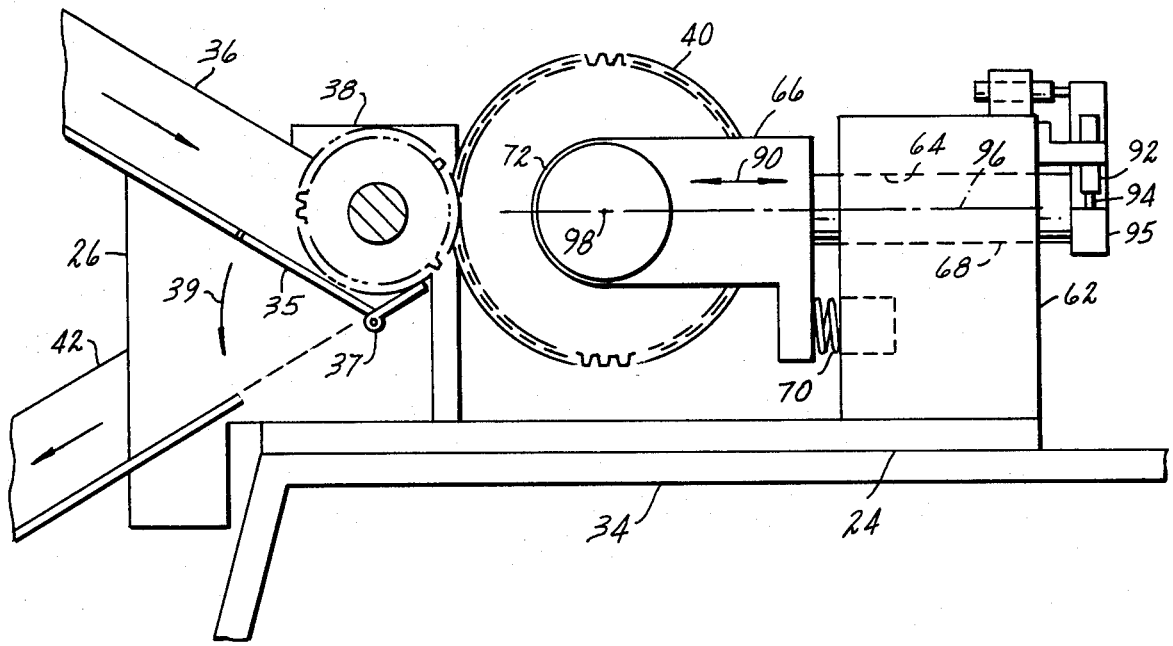
FIG. 3 is a section view of the automatic gear checking structure illustrated in FIG. 1 taken substantially on the line 3—3 in FIG. 1.
Figure 4:
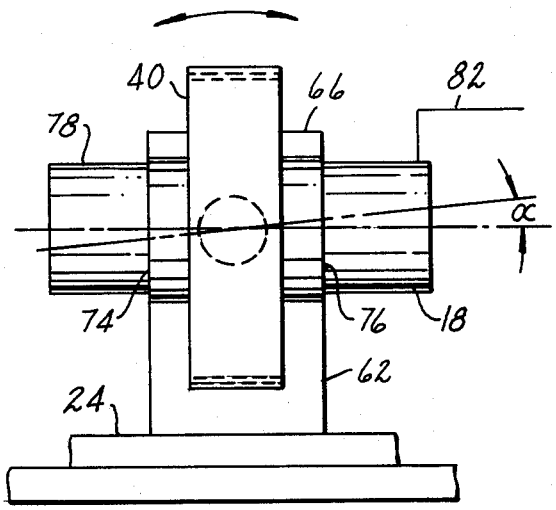
FIG. 4 is a section view of the automatic gear checking structure illustrated in FIG. 1 taken substantially on the line 4—4 in FIG. 1.

The base 24 as shown best in FIG. 1 is a flat rectangular steel plate which as shown in FIG. 3 may be mounted on a machine member or table 34 by convenient means not shown such as bolts.

The work gear guide structure 26 as shown best in FIGS. 1 and 3, includes a feed chute 36 for passing working gears one at a time by gravity into engagement with a master gear such as master gear 40. The guide means 26 further includes the chute 42 for guiding work gears 38 away from the gear checking structure 10 after they have been checked. Again, the work gears are fed through chute 42 by gravity.

As shown in FIG. 3, by way of example only the upper chute 36 and lower chute 42 are positioned vertically aligned and the lower end 35 of the upper chute 36 is pivoted at 37 in the direction of arrow 39 in response to a signal from the electronic portion 14 of the gear checker 10 to form an upper or floor portion for lower chute 42. Other gear guide structure 26 is contemplated by the inventor and is not part of the invention.

Figure 2:
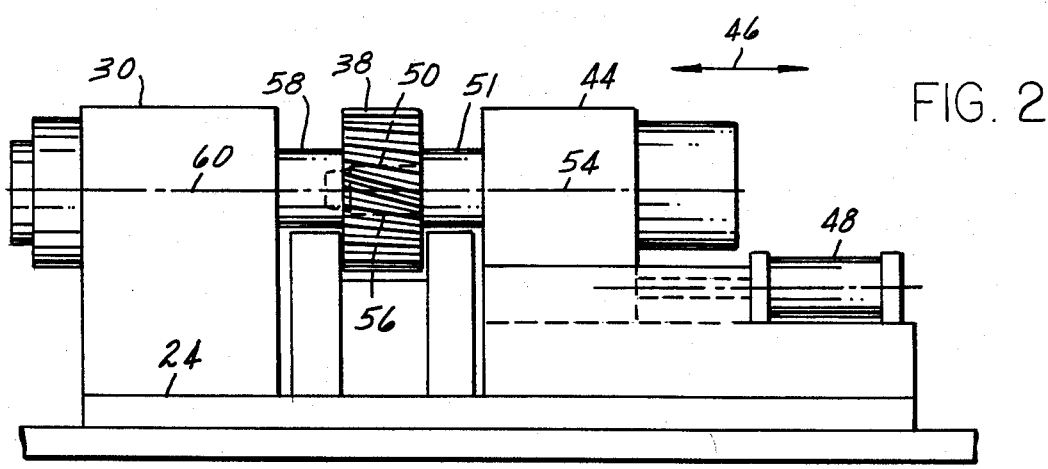
FIG. 2 is an end view of the automatic gear checking structure illustrated in FIG. 1 taken substantially in the direction of arrow 2 in FIG. 1.

The structure for mounting the work gears 38 as shown best in FIGS. 1 and 2 includes a slide base 42 mounted on the base 24 and a slide 44 positioned on the slide base 42 for reciprocal movement in the direction of arrows 46. The slide 44 is reciprocably moved through piston and cylinder structure 48, the piston of which is attached to the slide 44 and the cylinder of which is secured to the slide base 42 as shown best in FIG. 2.

Arbor 50 is mounted in slide 44 for rotation with respect thereto about the axis of rotation 54. Arbor 50 is positioned and arranged to engage a gear at the lower end of chute 36 through the internal opening 56 therein on movement of the slide 44 to the left in FIG. 2.

Engagement of the work gear 38 by the arbor 50 lifts the gear 38 from the chute 36 and places it in tight mesh with the master gear 40. Withdrawal of the arbor 50 from the gear 38 releases the work gear 38 into the chute 42 in which it is guided away from the gear checker 10.

Electromechanical transducer 16, as shown, is also mounted on the slide 44 and will be considered in more detail subsequently.

Motor means 30 as shown best in FIGS. 1 and 2, includes an electric motor, not shown, operable to rotate the spindle 58 about its axis of rotation 60 which is congruent with the axis of rotation 54 of the arbor 50, on engagement of the arbor 50 with the spindle 58. Thus, the continued movement to the left of the arbor 50 after it has engaged a work gear 38 and placed it in tight mesh with the master gear 40 causes engagement of the arbor 50 with the spindle 58 and therefore rotation of the arbor 50, the work gear held thereon and master gear 40 in tight mesh therewith.

The structure 32 for mounting the master gear 40 as best shown in FIGS. 1 and 3, includes a master gear mounting member 62 secured to the base 24 and having a cylindrical opening 64 therethrough. The master gear mounting structure 32 further includes the master gear holding member 66 having one cylindrical end 68 which is positioned in the opening 64 in the master gear mounting member 62 for both axial movement within the opening 64 and rotation about the axis of generation 96 of the cylindrical end 68 of the master gear holding member 66.

Resilient means such as spring 70 is positioned between the master gear mounting member 62 and the master gear holding member 66 as shown best in FIG. 3 to urge the end 72 of the master gear holding member 66 away from the master gear mounting member 62 and into engagement with a work gear.

The end 72 of the master gear holding member 66 is biforcated to provide the separate portions 74 and 76 between which the master gear 40 is mounted for rotation on the spindle 78. As shown in FIG. 1, the transducer 18 is also mounted on spindle 78.

The transducers 16 and 18 are identical and are provided to measure the angular position of the work gear 38 and master gear 40. They are optical encoders and include indices on the spindle 51 holding the arbor 50 and on the spindle 78 on which the master gear 40 is mounted and stationary, optical to electrical pick up structure held in close proximity to the indicia whereby on rotation of the spindles separate digital electrical signals are provided on the conductors 80 and 82 respectively, representative of the angular position of the work gear and master gear.

In a preferred embodiment for example, the number of indices on each spindle is equal to $2^{16}$ over a complete rotation of 360° of the spindles. As will be seen subsequently, the number of digital pulses produced by the optical encoders may be reduced electronically to provide more workable numbers as by a divider circuit. Similarly, positions between digital pulses or divided digital pulses may be determined electronically by electronic circuits including clocks and interpolation circuitry.

The particular transducers 16 and 18 are not new and are in fact well known articles of commerce which may be purchased from various suppliers. A preferred embodiment of the transducers 16 and 18 is purchased from Itek Measurement Systems, A Division of Itek Corporation 27 Christina St., Newton, Mass. 02161 as their Digisec optical encoder RIL 16/60(4).

The electromagnetic transducer 20 is a linear voltage differential transformer commonly known as an LVDT which has a coil 84 fixedly mounted on the master gear mounting member 62 and an internal core 86 which is axially movable within the coil 84. The core 86 is biased into engagement with a T-shaped extension 88 on the end 68 of the master gear holding member 66.

Thus, on movement of the master gear 40, in the direction of arrows 90 with the master gear holding member 66, an analog electric signal will be generated by the LVDT 20 representative of the change in center to center distance of a master gear 40 held by the master gear holding member 66 in tight mesh with a work gear 38 secured in a radially fixed position on arbor 50. The analog electrical signal is passed to the electronic portion 14 of the automatic gear checker 10 through conductor 89 as shown best in FIG. 1.

Similarly, the electromagnetic transducer 22 is a linear voltage differential transformer including a coil 92 and a core 94. Since the LVDT 22 is offset from the axis 96 of the cylindrical end 68 of the master gear holding member 66, and the core 94 is biased into engagement with one portion 95 of the cross bar of the T-shaped extension 88 on the end 68 of the master gear holding member 66, the analog electrical signal produced by the LVDT 90 and passed to the electronic portion of the automatic gear checker 10 over the conductor 94 will be proportional to the angular rotation of the end 68 of the master gear holding member 66 within the opening 64 which will be the same as the angular rotation of the axis of generation or axis of rotation 98 of the master gear 40.

Figure 9:
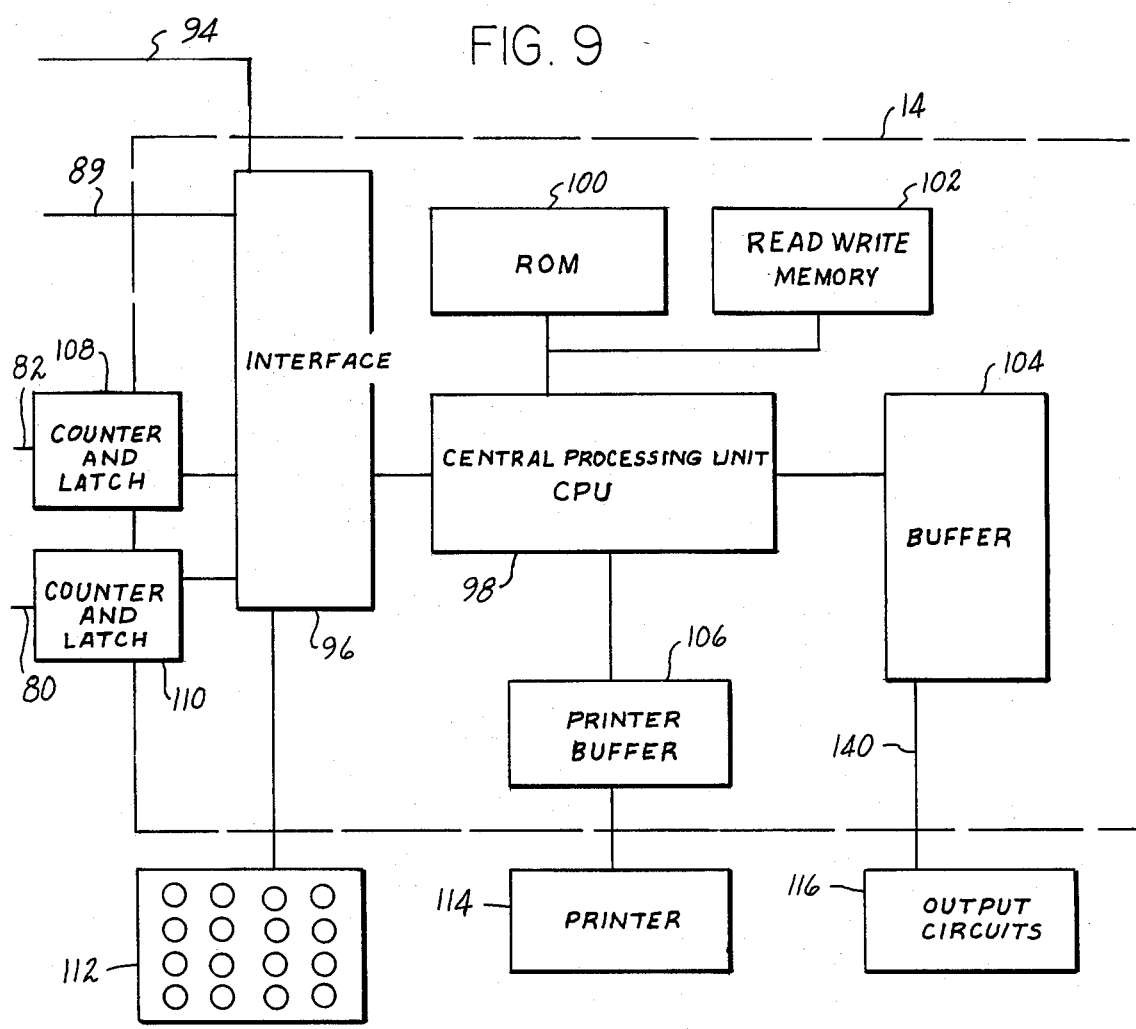
FIG. 9 is a block diagram of the electronic portion of the automatic gear checking structure illustrated in FIG. 1.

The signals into the electronic portion 14 of the gear checking apparatus 10 over the conductors 80, 82,89 and 94 as best shown in FIG. 9, are then digital signals on the conductors 80 and 82 representing the angular rotated position of the work gear 38 and master gear 40 respectively. The analog signals on conductors 89 and 94 are representative of the center to center distance of the master gear and work gear in tight mesh and the angular rotation of the axis of generation of the master gear respectively.

The parameters of relative work and master gear positions and center to center distance between the master gear and working gear and the angular displacement of the axis of generation of the master gear in mesh with the working gear may be utilized to provide a plurality of checks on the shape of the working gear. Specifically well known gear tooth erros such as nicks, bumps, over or undersize, lead, helix error and eccentrically may be checked.

Figure 5:
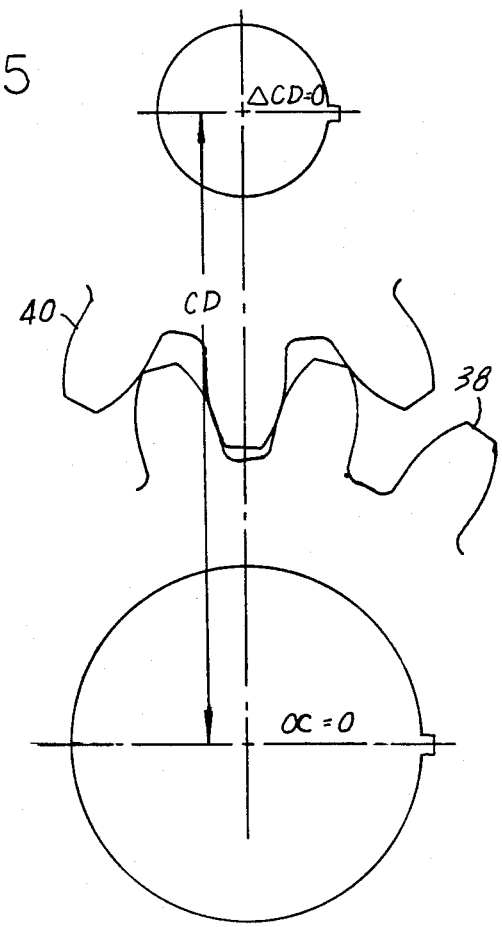
FIG. 5 is an elevation view of a working gear having no error in tight mesh with a master gear which is useful in describing the invention.

Thus, as shown in FIG. 5, with the master gear rotated in tight mesh with the working gear 38, if the working gear is of the desired shape, the center to center distance CD will be the required center to center distance without deviation. Similarly, there will be no relative angular displacement $\alpha$ between the angular position of the working gear and master gear.

However, as shown in FIG. 6, if for example the teeth of the working gear 38 are oversized, equally on both flanks so that the angular variation which is positive in the direction of the arrows on the adjacent flanks of two teeth are $\alpha_1$ and $\alpha_2$ as shown in FIG. 6, then only the center to center distance of the working gear with respect to the master gear is affected and will be positive in the direction of the arrow, that is, $\Delta CD$ will be positive, there will be no variation in the relative angular position of the working gear and master gear 38 and 40, respectively.

Similarly, with respect to FIG. 7, if the teeth of the working gear 38 are misplaced and have equal but opposite erros on both flanks, that is $\alpha_1$ is equal to $\alpha_2$, there will be no deviation in the center to center distance between the master gear 40 and the working gear 38, however, the relative angular position of the gears $\alpha$ will be $(\alpha_1 - \alpha_2)$.

Progressing to FIG. 8, if there is an error in position of a single flank of a tooth of the working gear, there will be a center to center distance error between the working gear 38 and master gear 40 as well as a difference in the angular position between the master gear and working gear.

The determining of the errors in the working gears 38 from the measured parameters, that is, relative positions of the working gear and master gear center to center distance and angle of the axis of rotation of the master gear is affected by the electronic portion 14 of the automatic gear checking structure 10.

As shown best in FIG. 9, the electronic portion 14 of the automatic gear checking structure 10 includes an interface circuit 96, a central processing unit 98, a read only memory 100, a read write memory 102, an output buffer 104, and a printer buffer 106. The electronic portion 14 of the gear checking apparatus 10 as shown in FIG. 6, further includes a master gear position counter and latch circuit 108 and a work gear counter and latch circuit 110. The electronic portion 14 as shown in FIG. 6, also includes the input keyboard panel 112, printer 114, and output circuits 116, as desired.

Figure 10:
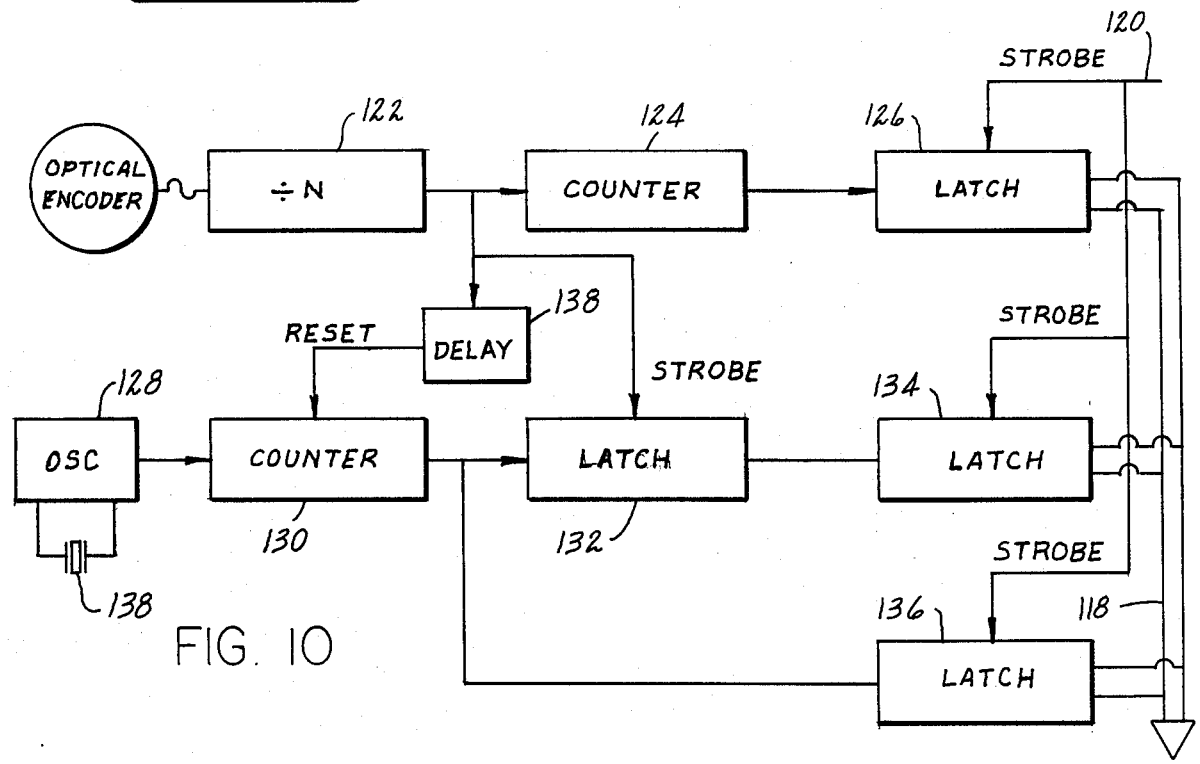
FIG. 10 is a block diagram of one of the counter and latch circuits of the electronic portion of the automatic gear checking structure illustrated in FIG. 9.

The master gear and work gear counter and latch circuits 108 and 110 are the same. Accordingly, only the work gear counter and latch circuit 110 is shown in detail in FIG. 10. The work gear counter and latch circuit 110 as shown in FIG. 10, receives the digital input signal on the conductor 80 from the optical encoder of transducer 16 and provides a digital signal readout from the central processing unit 98 through the interface circuit 96 which provides an instantaneous reading of the digital signal from the transducer 16 representative of the instantaneous position of the work gear 38 in response to a strobe signal from the central processing unit 98 on conductor 120.

The counter and latch circuit 110 includes dividing circuit 122, counter 124, latch 126, oscillator 128, counter 130, latch 132, latch 134 and latch 136. A time delay circuit 138 is also provided in the counter and latch circuit 110. The dividing circuit 122, oscillator 128, time delay circuit 138, counters 124 and 130 and latches 126, 132, 134 and 136 are connected as shown in FIG. 10.

As previously indicated, the transducer 16 is an optical encoder with a $2^{16}$ bit resolution and is commercially available. The dividing circuit 122 is also a commercially available circuit as are all of the other separate circuits in the counter and latch circuit 110.

The dividing circuit 122 divides the digital signal output of the transducer 18 by a number N which makes the digital signal easier to work with. The number N is determined by the tooth number ratio of the work gear and master gear and the speed of revolution thereof. Thus, for example, N=8 for a work gear driven at 30 revolutions per minute in mesh with a master gear wherein the work gear and master gear have a tooth ratio of one to one.

The counter 124 totals the digital pulses from the dividing circuit 122 and is reset by the central processing unit at the start of each cycle of operation of electronic portion 14 of the automatic gear checker 10.

The oscillator 128 is a crystal controlled oscillator. The crystal 138 controlling the oscillator 128 is for example a two megahertz crystal.

Counter 130 counts the output pulses of the oscillator 128 until reset from a pulse from divider 122 after a small time delay determined by the time delay circuit 138.

The time delay circuit 138 is a monostable time delay circuit and delays the reset pulse to the counter 130 from the central processing unit until a previous total in the counter 130 has been stored in the latch 132.

Latch 132 stores the maximum reading of the counter 130 on being strobed by the output signal of the dividing circuit 122.

The latch 134 stores the most recent maximum value of the counter 130 held in the latch 132. The signal stored in the latch 134 is subsequently read into the central processing unit 98 on the latch 134 being strobed by a signal from the central processing unit over conductor 120.

The latch 136 sotres the current value of the counter 130 for readout to the central processing unit 98 on being strobed by a central processing unit.

The latch 126 stores the current value of the counter 124 for readout to the central processing unit 98 again on being strobed by the central processing unit. As pointed out above, the latches 126, 134 and 136 are strobed over the conductor 120 all at the same time to permit simultaneous storage of the data in the latches for future readout by the central processing unit 98 as needed over the data buss 118.

Thus, in the overall operation of the electronic portion 14 of the automatic gear checking structure 10, the counter and latch circuit 110 receives as an input digital signals from the optical encoder 16 which represent the position of the work gear 38. The counter and latch circuit 110 provides output digital signals from latches 126,134 and 136 as of the instant of time the latches 126,134, and 136 are strobed by the central processing unit 98. The digital output signals permit determining of the exact angular rotational position of the work gear in accordance with the programming of the central processing unit which will be considered subsequently.

The counter and latch circuit 108 is similar to the counter and latch circuit 108 as indicated above and permits the determination of the exact angular rotational position of the master gear 140 by the central processing unit as indicated above.

The interface circuit 96 includes analog to digital converters for changing the signals from the electromechanical transducers 20 and 22 into digital signals representative of the center to center distance between the master gear 40 and a work gear 38 and the angular displacement of the axis of generation of the master gear 40 in a meshed condition from an initial position thereof with the master gear 40 in an unmeshed condition.

The interface circuit 96 includes circuits for transforming the voltage of the signals into the interface circuit 96 from the transducers 20 and 22 and the counter and latch circuits 108 and 110 into a form suitable for use by the central processing unit 98. That is to say, the interface circuit 96 makes the input signals from the mechanical portion 12 of the automatic gear checker 10 compatable with the electronic portion 14 of the gear checker.

The read only memory 100 is preprogrammed to control the central processing unit 98 to function in a manner which will be considered subsequently. The read only memory may be programmed not only to effect the proper computation by the central processing unit 98 but also to provide desired control signals as an output through the output buffer 104 and the printer buffer 106.

The read write memory circuit 102 is utilized by the central processing unit 98 to store and retrieve from memory, signals necessary in the processing of the information fed into the central processing unit 98. Thus, for example, the read write memory will store the signals in each instant of time that are provided by the transducers 16,18,20 and 22. The signals stored in the read write memory 102 are available to the central processing unit program, as placed in the read only memory.

The output buffer 104 receives signals from the central processing unit 98 to effect certain functions. Thus, for example, signals may be provided on conductor 140 to effect feeding of a work gear 38 down chute 36, placing the master gear 40 into tight mesh with the work gear 38, driving the arbor 50 through the working gear 38 to rotate the working gear 38 and to subsequently discharge the work gear 38, down chute 42 or selectively down a number of chutes depending on the condition of the working gear 38 checked. Other signals from the output buffer 104 can be provided for example to energize indicator lights or the like indicating the condition of a work gear 38.

In other words, substantially any output signal desired relative to the checking procedure accomplished by the gear checker 10 is outputted through the output buffer 104. Basically, the output buffer 104 changes a signal provided by the central processing unit into a signal capable of being utilized for the purpose desired. For example, output buffer 104 may change the voltage of a signal from the central processing unit 98 to permit operation of indicator lights.

Similarly, the printer buffer 106 provides an interface between the central processing unit signals and a printer 114 for providing a print out of the parameters of the work gear and master gear rotated in tight mesh checked by the central processing unit 98.

The keyboard or control panel 112 is utilized to provide exterior instructions to the central processing unit 98 and/or to change the program in the read only memory as desired. Thus, for example, the control panel 112 may be utilized to vary the limits indicating a good gear if so desired.

In fact, the electronic portion 14 of the automatic gear checking structure 10 is a purchased unit and includes all of the structure within the outline designated 14 in FIG. 9 and the counter and latch circuits 108 and 110 and the keyboard or control panel 112. The unit is available as a Moore System 800 Microprocessor gagging system from Moore Products Company, Springhouse, Pa. 19477. The system 800 Microprocessor may be programmed to effect the desired operation of the central processing unit 98 in accordance with the algorithm of FIG. 11.

In accordance with the algorithm of FIG. 11 the output functions of the electronic portion 14 of the automatic gear checking structure 10 are available through the output buffer 104 and the printer buffer 106 or sensing the parameters of angular rotational position error between the master gear and work gear, a center to center distance error between the master and work gear and an angular displacement of the axis of generation of the master gear error signal.

Available in accordance with the algorithm of FIG. 11 are the maximum and minimum position deviations of the gears for both flanks of the teeth of the work gear. Also, the average center to center distance variation and average variation of the work gear and master gear and variation and average variation of the axis of generation of the master gear are available from the central processing unit 98.

More specifically, with regard to the algorithm of FIG. 11, a cycle of operation of the gear checker 10 is started at 150 with a work gear 38 in mesh with a master gear 40 and with the work gear 38 rotating.

As indicated at 152, all latches and counters are then reset to initialize all the variables in the electronic portion 14 of the gear checking structure 10.

As shown at 154, a pause in the operation of the electronic portion 14 is then effected until valid data is generated. A pause of approximately 250 microseconds is considered adequate.

The latches and analog to digital converters in the interface circuit 96 and counter and latch circuits 108 and 110 if separate from interface circuit 96, are then strobed. Thus, the data from all sources are froze at the same instant and read into the read write memory 102 through the central processing unit 98. Such operation is indicated at 156.

The central processing unit 98 is then utilized to calculate the position of the work gear ($P_g$) as shown at 158 in the algorithm in accordance with the formula $P_g$ equals on the count on latch 126 plus the count on latch 136 is over the count on latch 134.

The position of the master gear ($P_m$) is also determined at this time by the central processing unit in accordance with the count of the same latches from the counter and latch circuit 108, as shown in 160 in the algorithm of FIG. 11.

The central processing unit 98 in accordance with the program in the read only memory 100, then calculates the angular deviation in the position of the work gear ($P_g$) and the position of the master gear ($P_m$) in accordance with the formula:

$$\alpha = K_1 \left( P_g - \left( P_m \times \frac{N_g}{N_m} \right) \right)$$

which formula is give at 162 in the algorithm of FIG. 11.

In this formula, $\alpha$ equals the deviation between the positions of the master gear and work gear. $P_g$ equals the position of the work gear, $P_m$ equals the position of the master gear, $N_g$ equals the number of teeth in the work gear, and $N_m$ equals the number of teeth in the master gear.

The signal $\alpha_i$ and the signal $\Delta CD_{mg}$ and $\Delta \psi$ are respectively the deviation in the angular rotated positions of the master gear and working gear, the deviation in the center to center distance between the master gear and work gear, and the deviation in the angular position of the axis of generation of the master gear 40 at a checked location i at the instant the signals into the electronic portion 14 of the gear checker 10 were frozen are stored for later use in the read write memory 102 as indicated at 164.

The position of the work gear, that is, $P_g$, is then interrogated by the central processing unit to determine if in the checking program for the work gear, the work gear has completed one complete revolution. This checking is indicated at 166 in the algorithm in FIG. 11.

If the work gear has not passed through a complete revolution, a pause is provided as indicated at 168 to permit the memory to be indexed and the algorithm steps 156, 158, 160, 162 and 164 and 166 to be repeated.

After these steps have been repeated, as for example 500 times a second, until the work gear has been indexed through a complete revolution and all the desired data is stored in the read write memory 102, a counter in the central processing unit 114 is initialized to cause indexing through the data stored in the memory in step 164 of the algorithm of FIG. 8 as indicated at 170.

At this point, it should be recognized that the steps 150 through 166 have essentially been data gathering steps. They could be performed concurrently with the following steps for analyzing and reducing the data.

Steps 172 and 174 in the analyzing and reduction of the data stored are to determine the angular rotational errors of the flanks of the teeth of the work gear which is a unique advantage of the invention, since this data can be obtained with only one revolution of the work gear 38 with a single master gear 40.

Steps 176 through 194 and 200 and 202 obtain additional information that is of value to the user in checking a work gear 38.

More specifically, in step 172, of the algorithm of FIG. 11, the position error in a first flank of the teeth of the gear 38 is calculated using the formula:

$$\alpha = \alpha_i + \frac{\Delta CD_i}{2K_2}$$

where:
  $\alpha_{1i}$ is the position error of the first flank of a tooth of a work gear engaged with the master gear at between the work gear and instant i;
  $\alpha_i$ is the position error between the work gear and master gear at instant i as stored;
  $\Delta CD_i$ is the deviation from the desired center to center distance between the master gear and the work gear in mesh with the master gear at the first location i; and
  $K_2$ is a constant for changing inch radians to inches per second or arc and is equal to $$\frac{R_{bg}}{2 \sin \phi} \times \frac{\pi}{180} \times \frac{1}{3600}$$

wherein:
  $R_{bg}$ is the base radius of the work gear; and
  $\phi$ is the operating pressure angle.

In step 174 of the algorithm of FIG. 11, the angular deviation of the second flank of the tooth of the work gear 38 is determined utilizing the formula:

$$\alpha 2_i = \alpha 1_i - 2\alpha_i.$$

In steps 176 through 182 of the algorithm of FIG. 11 the position error of one flank of one tooth of the gear 38 is checked against a maximum angular position error for the first flank of a tooth on the gear 38. If the position of the first flank of the tooth of the gear 38 is greater than the maximum desired position thereof, then the maximum allowable angular rotational position of the first flank of the tooth of the gear 38 will be the maximum angular rotational position of the first flank of the tooth of the gear 38 against which the next position in the gear tooth will be checked.

Similarly, if the maximum angular rotational position of the second flank of a tooth of the gear 38 is greater than the previous maximum angular rotational position of a second flank of a gear tooth on the gear 38 then the maximum angular rotational position of the second flank of the first gear tooth of the gear 38 will be the new maximum angular rotational position for the second flank of the gear teeth of the gear 32 stored for comparison in subsequent checks and for ultimate checking against a maximum allowable angular rotational position of the second flank of the teeth of the gear 38 as set forth in the step 178 of the algorithm of FIG. 11.

Similarly, with the steps 180 and 182 of the algorithm of FIG. 8, the minimum angular rotational positions of many individual points on the teeth of the gear 38 are checked against previous minimum angular rotational positions thereof and new minimum angular rotational positions are stored for the first and second flanks of the gear teeth of the gear 38 as they are found. Again, the minimum angular rotational positions of the first and second flanks of the gear teeth are compared with acceptable minimum positions thereof to fully classify a gear 38 being checked with regard to angular rotational positions of the first and second flanks of each tooth thereof.

As set forth in step 184 of the algorithm of FIG. 8, the center to center distance between the gears total is a composite of the center to center distance error total of the points on the teeth of a gear 38 which have been checked plus the center to center distance error of the point currently being checked.

Also, as above, the center to center distance error of the gears being tested may be compared with a maximum center to center distance differential and a minimum center to center distance differential and the current measurement of the center to center distance differential at a point checked may be substituted for the maximum and minimum center to center distance differential if they are in fact greater than or less than the previously found center to center distance error maximum and center to center distance error minimum. Ultimately, the center to center distance maximum and the center to center distance minimum stored after a complete revolution of a work gear 38 may be compared against acceptable standards to classify the gear 38 all as indicated in steps 186 and 188 of the algorithm of FIG. 11.

Similarly, the rotational angle $\psi$ of the axis of generation of the master gear 40 may be measured at each check point on the work gear and the total angle $\psi$ recorded. The total angle $\psi$ of course equals the error $\psi$ for the other points on the gear which have been checked plus the error in angle $\psi$ for the location currently being checked as indicated in step 190 of the algorithm of FIG. 11.

In steps 192 and 194 of the algorithm of FIG. 8, the differential angle $\psi$ of each location on gear 38 may be compared with the maximum differential angle and minimum differential angle noted for any location on the gear 38 being checked and if the $\psi$ angle difference of the particular location being checked is larger than the previously stored minimum value, then the new values will be stored as the maximum and/or minimum $\psi$ angle errors. Again, subsequently, the maximum and minimum $\psi$ angle errors of a gear may be utilized to classify the gear.

After completing the steps 172 through 194 as indicated in the algorithm of FIG. 11, the central processing unit interrogates its read write memory to determine if all of the locations on the work gear 38 have been checked as indicated in step 196 of the algorithm of FIG. 11. If all of the locations on the gear 38 have not been checked, then the steps 172 through 194 are repeated.

If all of the locations on a work gear 38 have been checked, then the average error in the angle of the axis of rotation of the master gear 40 overall of the locations checked of the work gear 38 is computed as shown in step 200 by dividing the number of locations of the work gear checked into the total angular error of the axis of rotation of the master gear and the $\psi$ angle error average may again be utilized to classify the gear 38.

Similarly, as shown at step 202 in the algorithm of FIG. 11, the center to center distance average error is computed utilizing the formula, $$CD_{Ave} = CDg + \frac{CD_{Tot}}{N}$$

where:
CDg is the desired center to center distance of the gears in mesh, $\Delta CD_{Tot}$ is the total of the center to center distance errors at all of the locations checked and N is the number of locations checked.

The algorithm of FIG. 11 is then completed by displaying the results of the checks of the parameters indicated at 204 and providing operational output signals to remove a gear 38 checked from the mechanical apparatus 12 and to position a new gear 38 in the mechanical apparatus 12 for checking.

The particular program necessary to cause the Moore System 800 Microprocessor gaging system to function in accordance with the algorithm of FIG. 11 is believed to be easily within the skill of those in the art and will not therefore be considered at this time.

While one embodiment of the present invention has been considered in detail, it will be understood that other embodiments and modifications thereof are contemplated. It is the intention to include all such embodiments and modifications as are defined by the appended claims within the scope of the invention.

I claim:

1. Gear checking structure comprising means for placing a master gear and a gear to be checked in tight mesh means operably associated with at least one of the gears for positively rotating the one gear, means operably associated with the meshed gears for sensing a plurality of operating parameters of the gears generated on rotation of the gears in tight mesh at least one of which is angular position of one of the gears about its axis of rotation and means connected to the means for sensing the parameters for determining deviation of the shape of the work gear from the desired shape of the work gear in accordance with the generated parameters including at least the angular position of the one of the gears about its axis of rotation.

2. Structure as set forth in claim 1, wherein the parameters sensed further include one or more of the angular position of the master gear in rotation about its axis of generation, the angular position of the work gear in rotation about its axis of generation and the relative angular displacement of the axis of generation of the master gear on engagement of the master gear with the work gear.

3. Structure as set forth in claim 2, wherein the parameters sensed further include the center to center distance between the master gear and work gear.

4. Structure as set forth in claim 1, wherein the parameters are sensed within a single revolution of the work gear.

5. Structure as set forth in claim 1, wherein the means for determining deviation of the shape of the work gear from a desired shape therefore includes means for determining the specific type of deviation in the shape of the work gear.

6. Structure as set forth in claim 5, wherein the specific type of deviation of the shape of the work gear from the desired shape of the work gear is at least one of nicks or bumps in the surface of the teeth of the work gear, angular displacement of a tooth or a flank of a tooth of the work gear about the axis of generation of the work gear, tooth thickness and helix angle error of a tooth of the work gear.

7. Structure as set forth in claim 1, wherein the means for determining the deviation of the shape of the work gear from the desired shape of the work gear includes structure for producing a position signal representative of an angle difference between the angle through which the work gear should have been rotated in mesh with the master gear and the angle through which the work gear has actually been rotated in mesh with the work gear and the angle difference is computed in accordance with the formula:

$$\alpha = K_1 \left( P_g - \left( P_m \times \frac{N_g}{N_m} \right) \right)$$

wherein:
$\alpha$ = the angular difference between the rotation of the master gear and the work gear;
$P_g$ = the angular position of the work gear;
$P_m$ = the angular position of the master gear;
$N_g$ = the number of teeth in the work gear;
$N_m$ = the number of teeth in the master gear;
$K_1$ = is a constant necessary to change inches per radian into inches per second of arc and is equal to $$\frac{N}{\text{counts per revolution of optical encoder}} \times 360 \times 3600$$

wherein:
N = the number by which the counts per revolution is divided by.

8. Structure as set forth in claim 1, wherein the means for determining the deviation of the shape of the work gear from the desired shape of the work gear includes structure for producing a position signal representative of the difference between the actual rotated position of one flank of a tooth of the work gear and the desired rotated position of the one flank of the work gear computed in accordance with the formula:

$$\alpha_{1i} = \alpha_i + \frac{\Delta CD_i}{2K_2}$$

wherein:

$\alpha_{1i}$ = the difference between the actual rotated position of one flank of a tooth of the work gear and the desired rotated position of the one flank of the work gear;
$\alpha_i$ = the angle difference between the angle through which the work gear has been rotated in mesh with the master gear and the angle through which the master gear has been rotated in mesh with the work gear;
$\Delta CD_i$ = is the deviation from the desired center to center distance between the master gear and work gear with the work gear in mesh with the master gear at the first location i; and
$K_2$ = a constant necessary to change inches per radian into inches per second of arc and is equal to:

$$\frac{R_{bg}}{2 \sin \phi} \times \frac{\pi}{180} \times \frac{1}{3600}$$

wherein:
$R_{bg}$ = base radius of work gear in inches;
$\phi$ = operating pressure angle between the work gear and master gear.

9. Structure as set forth in claim 8, wherein the means for determining the deviation of the shape of the work gear from the desired shape of the work gear further includes structure for providing a position signal representative of the difference between the actual rotated position of the other flank of a tooth of the work gear and the desired rotated position of the flank of the work gear computed in accordance with the formula:

$$\alpha_{2i} = \alpha_{1i} - 2\alpha_i$$

wherein:
$\alpha_{2i}$ = the difference between the actual rotated position of the other flank of a tooth of the work gear and the desired rotated position of the other flank of the work gear;
$\alpha_{1i}$ = the difference between the actual rotated position of one flank of a tooth of the work gear and the desired rotated position of the one flank of the work gear;
$\alpha_i$ = the angle difference between the angle through which the work gear has been rotated in mesh with the master gear and the angle through which the master gear has been rotated in mesh with the work gear.

10. Structure for automatically gaging gears comprising means for supporting a master gear for rotation about the axis of generation thereof and for permitting biased movement of the master gear in one radial direction and for permitting biased angular movement of the master gear on the axis of generation thereof, means positioned adjacent the means for supporting the master gear for feeding a work gear into engagement with the rotatably supported master gear, means operably associated with the means for feeding a work gear into engagement with the master gear for rotatably supporting the work gear in tight mesh with the master gear for at least one full revolution of the work gear means operably associated with the means for rotatably supporting the work gear for directing the work gear away from the master gear, means for separately sensing the angular position of rotation of the master gear operably associated with the master gear, the angular position of rotation of the work gear operably associated with the work gear, the center to center distance between the master gear and work gear operably associated with the master gear and the angular rotation of the axis of generation of the master gear operably associated with the master gear, with the master gear and work gear in tight mesh and means connected to the means for sensing the angular position of the gears, the center to center distance between gears and the angular rotation of the axis of generation of the master gear for determining deviations in the shape of the work gear in accordance therewith and for providing control signals in accordance with the deviation of the shape of the work gear from a desired shape thereof.

11. Structure as set forth in claim 10, wherein the means for rotatably mounting the master gear includes a base, a master gear mounting member secured on said base having an opening therethrough extending substantially parallel to and in spaced relation to said base, a master gear holding member having a cylindrical end extending through said opening in the master gear mounting member whereby reciprocal movement of the master gear holding member is permitted axially of the opening through the master gear mounting member and rotation of the master gear holding member within the opening through the master gear mounting member is permitted, the other end of the master gear holding member being bioforcated and means positioned between the portions of the bioforcated end of the master gear holding member for rotatably mounting the master gear.

12. Structure as set forth in claim 10, wherein the means for feeding a work gear into engagement with a master gear, for rotatably supporting the work gear in tight mesh with the master gear and for directing the work gear away from the master gear comprises a chute inclined downwardly to a position adjacent the master gear down which a work gear is permitted to pass into a position engaging the master gear, an arbor, means for extending the arbor through the work gear adjacent the master gear to bring the work gear into tight mesh with the master gear, motor means engagable with the arbor passed through the work gear to rotate the arbor and work gear in tight mesh with the master gear and a chute inclined downwardly from adjacent the work gear in mesh with the master gear for directing the work gear away from the master gear after the work gear has been checked.

13. Structure as set forth in claim 10, wherein the means for separately sensing the angular position of the master gear and work gear each comprise a separate optical generator operable to generate a digital electronic signal in accordance with the angular position of rotation of the master gear and work gear respectively.

14. Structure as set forth in claim 10, wherein the means for sensing the center to center distance between the master gear and work gear and for determining the angular rotation of the axis of generation of the master gear each comprise a separate linear variable differential transformer for determining the relative axial position of the one end of the master gear holding member and the relative angular position of the axis of generation of the master gear.

15. A method of automatic gear checking comprising driving a master gear in tight mesh with a work gear, sensing a plurality of parameters of the work gear in tight mesh with the master gear at least one of which is angular position of one of the gears about its axis of rotation and determining the deviation of the shape of the work gear from a desired shape thereof in accordance with the parameters sensed including at least the angular position of one of the gears about its axis of rotation.

16. The method as set forth in claim 15, wherein the parameters sensed further include one or more of the angular postion of the master gear in rotation about its axis of generation, the angular position of the work gear in rotation about its axis of generation and the relative angular displacement of the axis of generation of the master gear or engagement of the master gear with the work gear.

17. The method as set forth in claim 16, wherein the parameters sensed further include the center to center distance between the master gear and work gear.

18. The method as set forth in claim 15, wherein the parameters sensed are sensed in a single revolution of the work gear in tight mesh with the master gear.

19. The method as set forth in claim 15, and further including the step of determining the specific type of deviation in the shape of the work gear.

20. The method as set forth in claim 19, wherein the specific type of deviation in the shape of the work gear includes at least one of nicks or bumps in the surface of the teeth of the work gear angular displacement of a tooth or a flank of a tooth of the work gear about the axis of generation of the work gear, tooth thickness and helix angle error of a tooth of the work gear.

21. The method as set forth in claim 15, wherein in the parameters sensed include, the angular position of both of the gears about their own axis of rotation and further including the step of computing the angular difference between the rotated position of gears in accordance with the formula:

$$\alpha = K_1 \left( P_g - \left( P_m \times \frac{N_g}{N_m} \right) \right)$$

wherein:
$\alpha$ = the angular difference between the rotation of the master gear and the work gear;
$P_g$ = the angular position of the work gear;
$P_m$ = the angular position of the master gear;
$N_g$ = the number of teeth in the work gear;
$N_m$ = the number of teeth in the master gear;
$K_1$ = is a constant necessary to change inches per radian into inches per second of arc and is equal to $$\frac{N}{\text{counts per revolution of angular encoder}} \times 360 \times 3600$$

wherein:
N = the number by which the counts per revolution is divided by.

22. The method as set forth in claim 15, wherein determining the deviation of the shape of the work gear from the desired shape of the work gear includes producing a position signal representative of the difference between the actual rotated position of one flank of a tooth of the work gear and the desired rotated position of the one flank of the work gear computed in accordance with the formula:

$$\alpha_{1i} = \alpha_i + \frac{CD_i}{2K_2}$$

wherein:

$\alpha_{1i}$ = the difference between the actual rotated position of one flank of a tooth of the work gear and the desired rotated position of the one flank of the work gear;

$\alpha_i$ = the angle difference between the angle through which the work gear has been rotated in mesh with the master gear and the angle through which the master gear has actually been rotated in mesh with the work gear;

$CD_i$ = deviation from the desired center to center distance between the master gear and the work gear with the work gear in mesh with the master gear at the first location i; and $K_2$ = a constant necessary to change inches per radian into inches per second of arc and is equal to:

$$\frac{R_{bg}}{2 \sin \phi} \times \frac{\pi}{180} \times \frac{1}{3600}$$

wherein:

$R_{bg}$ = base radius of work gear in inches;

$\phi$ = operating pressure angle between the work gear and master gear.

23. The method as set forth in claim 22, wherein determining the deviation of the shape of the work gear from the desired shape of the work gear further includes providing a position signal representative of the difference between the actual rotated position of the other flank of a tooth of the work gear and the desired rotated position of the one flank of the work gear computed in accordance with the formula:

$\alpha_{2i} = \alpha_{1i} - 2\alpha_i$ wherein:

$\alpha_{2i}$ = the difference between the actual rotated position of the other flank of a tooth of the work gear and the desired rotated position of the other flank of the work gear;

$\alpha_{1i}$ = the difference between the actual rotated position of one flank of a tooth of the work gear and the desired rotated position of the one flank of the work gear;

$\alpha_i$ = the angle difference between the angle through which the work gear has been rotated in mesh with the master gear and the angle through which the master gear has been rotated in mesh with the work gear.

* * * * *